United States Patent

Amburn

[15] 3,675,367

[45] July 11, 1972

[54] APPARATUS FOR MAGNETICALLY TREATING SEEDS

[72] Inventor: Raymond D. Amburn, 11420 Canal Road, Sterling Heights, Mich. 48078

[22] Filed: July 27, 1970

[21] Appl. No.: 58,484

Related U.S. Application Data

[63] Continuation-in-part of Ser. No. 740,572, June 27, 1968, abandoned.

[52] U.S. Cl. ............................................... 47/1.3, 198/213
[51] Int. Cl. ............................................ A01g 7/04, A01c 1/00
[58] Field of Search .................................. 47/1.3, 58, DIG. 9; 198/213–217; 210/222–223

[56] References Cited

UNITED STATES PATENTS

| | | |
|---|---|---|
| 1,972,050 | 8/1934 | Davis ............................47/1.3 UX |
| 2,064,522 | 12/1936 | Davis ............................47/1.3 UX |

FOREIGN PATENTS OR APPLICATIONS 601,781   5/1948   Great Britain

*Primary Examiner*—Robert E. Bagwill
*Attorney*—McGlynn, Reising, Milton & Ethington

[57] ABSTRACT

Apparatus for magnetically treating seeds comprising a magnet for producing a magnetic field and a conduit for seeds extending through the magnetic field and having a fixed directional relationship with respect to the magnetic field. The seeds are caused to roll and tumble as they pass through the magnetic field in the conduit so that each seed is oriented in a multiplicity of positions with respect to the magnetic field during its movement through the magnetic field to thereby reduce the exposure time necessary to induce magnetism in the seeds.

64 Claims, 9 Drawing Figures

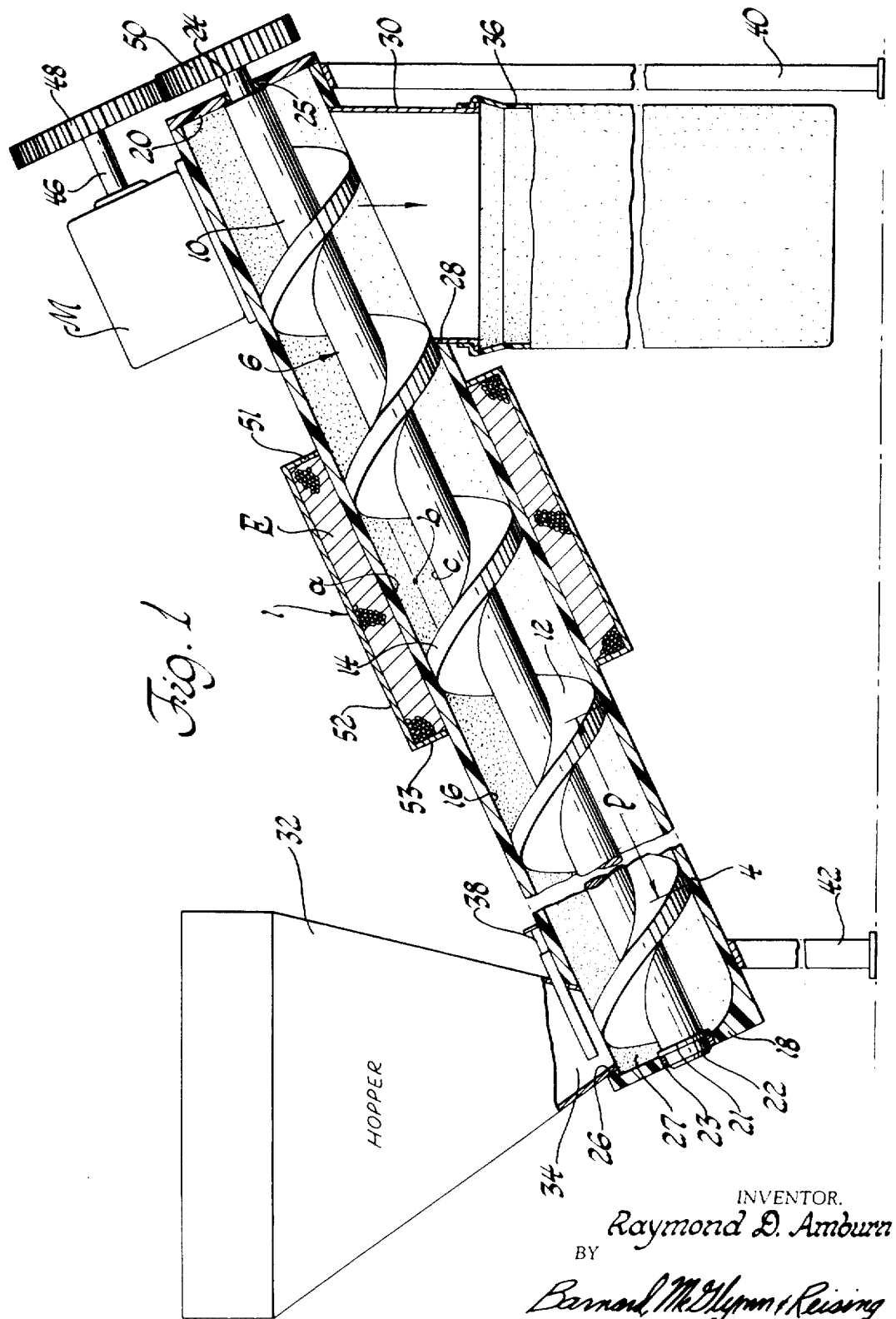

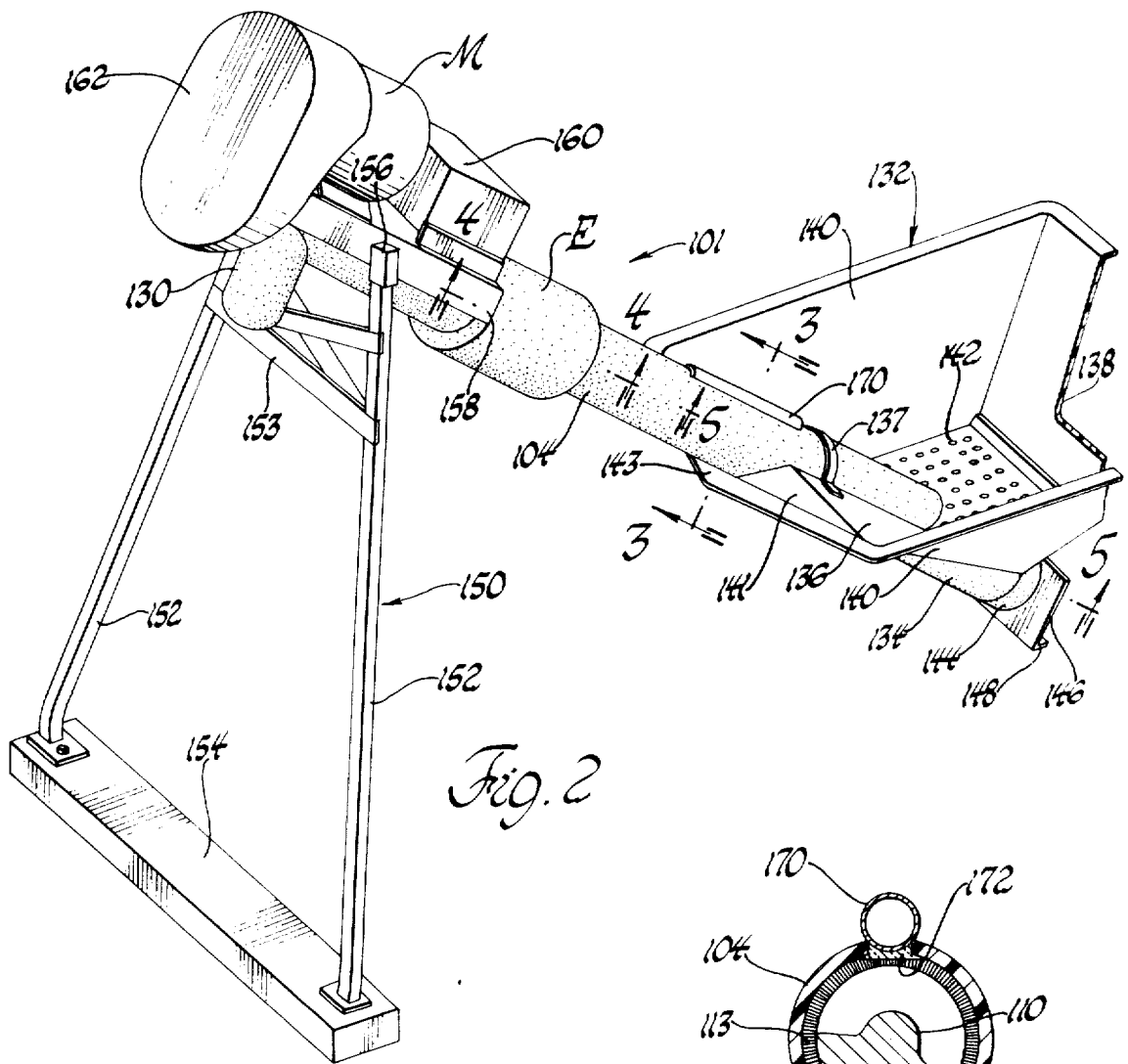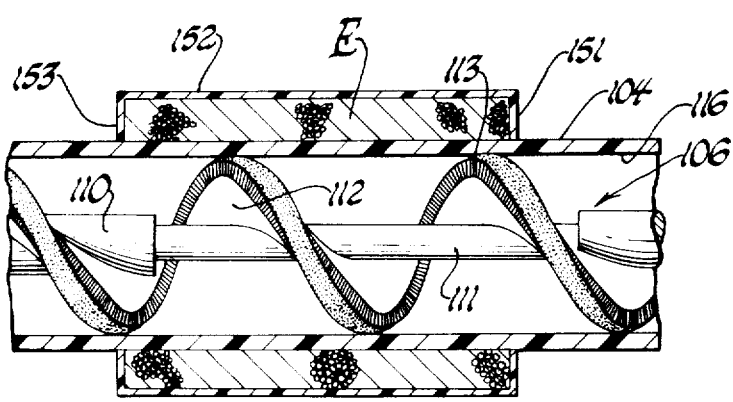

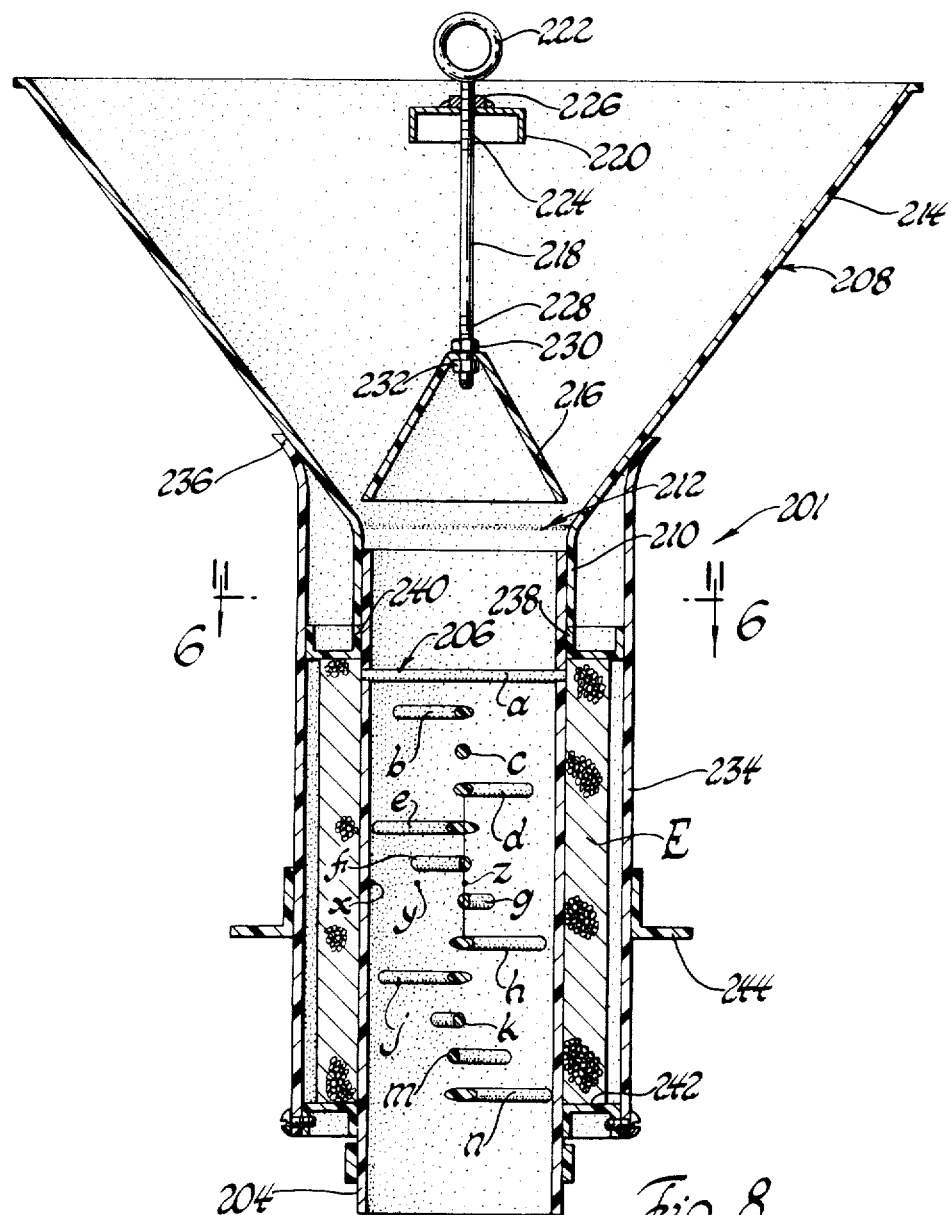
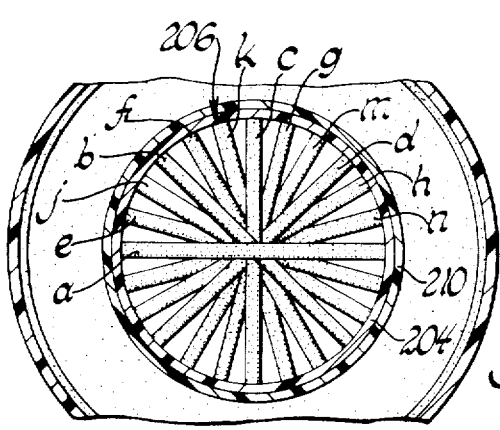

APPARATUS FOR MAGNETICALLY TREATING SEEDS

This application is a continuation-in-part of my copending application Ser. No. 740,572 filed June 27, 1968, and now abandoned, the entire disclosure of which is incorporated herein by reference.

This invention relates generally to the magnetic treatment of seeds and is particularly concerned with apparatus for moving seeds through a magnetic field in such a manner that the seeds are oriented in a multiplicity of positions relative to the magnetic field in a short length of time to reduce the exposure time necessary for adequate magnetic treatment of the seeds.

It has long been known that the rate of germination of seeds and the rate of plant growth from seeds is affected by magnetism. This phenomenon is discussed in the summer, 1968 issue of *Canada Agriculture* in an article entitled, "Biomagnetism—a Mysterious Plant Growth Factor," by U. J. Pittman.

Insofar as the effects of magnetism on the germination rate of seeds is concerned, the exact type of action that takes place is not completely known. However, when a seed is placed between the North and South poles of a regular horseshoe magnet for a period of time, it is known that the seed will germinate faster and larger than plants from seeds not so treated. As is pointed out in the Pittman article referred to in the preceding paragraph, seeds that have been placed in a stationary position between the poles of a permanent magnet for periods of up to 240 hours prior to planting germinate faster and grow more during the seedling stage.

The present invention results from attempts by the inventor to reduce the necessary exposure time for seeds to become adequately treated by magnetism so that seeds can be magnetically treated on a production basis. It is believed that the success of the present invention is due to the fact that the time required to adequately magnetically treat a seed depends to a large extent on the position of the seed with respect to the magnetic field, and that there is an ideal position for each seed with respect to the magnetic field in which the seed will become almost instantaneously energized by the magnetic field. It is believed that magnetism is induced into a seed through the RNA (Ribonucleic Acid) molecule, and that the RNA molecules orient themselves with the magnetic field when the seed is placed in the magnetic field. If the seed were placed in the ideal position within the magnetic field, the effects of the magnetism would be induced in the seed almost instantaneously. As pointed out above, if a seed is placed in a stationary position, it will become magnetized after an exposure time of 240 hours which appears to indicate that under the worst circumstances, that is, with the seed in the worst possible orientation with respect to the field, the seed will be magnetized after a period of 240 hours.

It is accordingly an object of this invention to provide apparatus for magnetically treating seeds to increase their germination and growth rate in which the exposure time in the magnetic field is reduced to the extent that a large quantity of seeds can be adequately treated in a short period of time.

Another object of this invention is to provide apparatus for producing a magnetic field with a conduit for seeds extending through the magnetic field and means for causing the seeds to assume a multiplicity of positions while in the magnetic field to substantially reduce the exposure time necessary to adequately treat the seeds.

Another object is to provide portable, self-contained magnetic treatment apparatus capable of treating a large quantity of seeds in a short period of time under field conditions with a minimum amount of skill required for the operation of the apparatus.

Still another object is to provide portable apparatus for treating a large quantity of seeds including a magnet for producing a magnetic field; means defining a conduit for seeds extending through the magnetic field and having a fixed directional relationship with respect to the magnetic field, and means for causing seeds passing through the magnetic field in the conduit to roll and tumble while in the magnetic field so that each seed is oriented in a multiplicity of positions with respect to the magnetic field during its movement through the magnetic field to reduce the exposure time for the seed necessary for adequate magnetic treatment to a matter of seconds.

An achievement of the foregoing, and other objects, apparatus according to the present invention includes a magnet for producing a magnetic field with a conduit extending through the magnetic field and associated with the magnet such that it has a fixed directional relationship with respect to the magnetic field produced by the magnet. Seeds fed through the conduit are caused to roll and tumble while in the magnetic field so that each seed is oriented in a multiplicity of positions with respect to the magnetic field during its movement through the magnetic field so that each seed has a substantial chance of becoming fully magnetized by the magnetic field.

In one embodiment of the invention, the conduit is provided by a tube of non-ferrous material such as aluminum, polyvinyl chloride and other plastic materials. An electromagnet is mounted on the tube intermediate the ends of the tube with the windings of the electromagnet wrapped around the tube. Accordingly, energization of the electromagnet sets up a field of magnetic flux within the tube.

A conveyor assembly is enclosed by the tube for moving the seeds in a continuous stream through the magnetic field. The conveyor assembly includes an auger that conveys the stream of seeds through the tube at a rate such that the seeds roll and tumble while in the magnetic field and are disposed in a multiplicity of positions with respect to the magnetic field as they pass through the conduit. The rolling and tumbling motion of the seeds is augmented by the action of the seeds against the surface of the helical flight of the auger.

In another embodiment of the invention, the turbulent, rolling and tumbling motion of the seeds is enhanced by reducing the cross-section of the shaft of the auger in the area of the magnetic field so that there is an abrupt change in the volume of the conduit when the seeds reach the magnetic field. The rolling and tumbling motion of the seeds is further enhanced by positioning the auger and tube in an inclined position with respect to the surface. The effects of gravity due to the inclination of the tube and auger increases the turbulent motion of the seeds in the magnetic field and increases the tendency of the seeds to move around the axis of the auger during rotation of the auger.

In another embodiment of the invention, a plurality of deflecting elements is mounted in the tube in the path of movement of seeds passing through the magnetic field for causing a rolling and tumbling motion of the seeds through the magnetic field. With this arrangement, the seeds can be fed by gravity through the magnetic field from a feed hopper positioned above the upper end of the tube defining the conduit of the seeds.

Other objects, advantages and features of the invention will become apparent from the following description, taken in connection with the accompanying drawings in which:

FIG. 1 is a sectional elevational view of one form of apparatus embodying the invention;

FIG. 2 is a perspective view of apparatus embodying the invention in a second form;

FIG. 3 is a sectional view taken on lines 3-3 of FIG. 2;

FIG. 4 is a sectional view taken on lines 4—4 of FIG. 2;

FIG. 8 is a sectional view of apparatus embodying the invention in another form; and FIG. 9 is a sectional view taken on lines 9—9 of FIG. 8.

Figure 5:
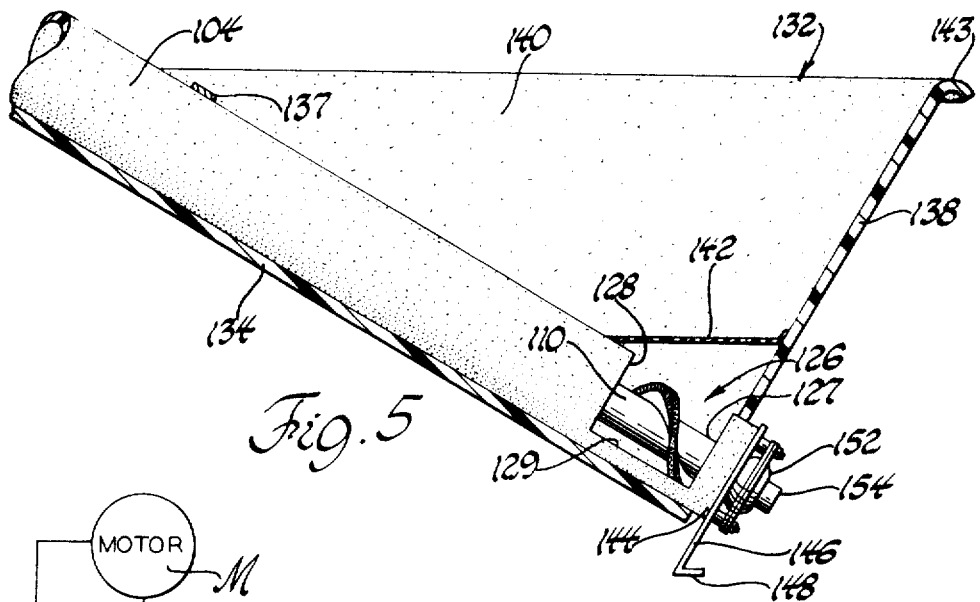
FIG. 5 is a sectional view taken on lines 5—5 of FIG. 2.

The apparatus shown in FIG. 1 is collectively designated by reference numeral 1 and comprises a magnet E mounted on a tube 4 defining a tubular conduit for seeds extending through the magnetic field produced by the magnet, the tubular conduit 4 having a fixed directional relationship with respect to the magnetic field. In the embodiment of FIG. 1, seeds are caused to move through the magnetic field of magnet E with a rolling and tumbling motion by a conveyor assembly including an auger 6. The tubular conduit 4 is of material that has little, if any, tendency to become magnetized, and will offer little or no interference to the field of magnet E. For example, tube 4 may be of non-ferrous material such as plastic or aluminum.

The auger 6 is coaxially mounted within tube 4 and includes a shaft 10 extending along the axis of tube 4 and a helical flight 12 mounted on and wound around shaft 10. The outer peripheral edge 14 of the helical flight 12 is in close proximity with the inner surface 16 of tube 4 to reduce the likelihood of seeds passing between, or becoming trapped between, the auger and the inner wall of the tube.

The magnet E comprises an electromagnet which is mounted on the tube 4 such that the tube 4 extends coaxially through the magnet and through the magnetic field produced thereby. The windings of the magnet are wrapped around the tube 4 so that when the magnet is energized, a magnetic field is provided within tube 4 in the path of seeds moving through the tube. The tube 4 of course has a fixed directional relationship with the magnetic field since the windings of the magnet in FIG. 1 are fixed with respect to the tube.

Tube 4 is formed with end wall members 18 and 20, and end portions 22 and 24 of the auger shaft 10 are respectively mounted in end wall members 18 and 20 by conventional bearing assemblies. The upper end portion 24 is reduced in cross section and is received in a bearing assembly 25 mounted in end wall member 20. The lower end 22 of shaft 10 is received in a bearing assembly 23 mounted in end wall member 18. Formed on the shaft adjacent end portion 22 is a radially outwardly extending collar or flange 21 which abuts the inner surface of end wall member 18.

Formed in the side wall of tube 4 adjacent end wall member 18 is an inlet opening 26, and formed in the side wall of tube 8 near end wall member 20 is a discharge opening 28. The discharge opening 28 is on the opposite side of the axis of tube 4 from inlet opening 26. Mounted in the discharge opening 28 is a spout 30, and a feed hopper 32 has its outlet end 34 received in the inlet opening 26. Suspended from the discharge spout 30 is a container 36 for receiving seeds expelled from tube 4 through discharge spout 30.

The tube 4 is supported in an inclined position by front support legs 40 and rear support legs 42 with the discharge opening 28 elevated with respect to the inlet opening 26, legs 42 being shorter than legs 40. A slide valve 38 of conventional construction is mounted on the side wall of tube 8 adjacent the inlet opening 26 for selectively adjusting the size of the inlet opening 26 to regulate the flow of seeds from hopper 32 into the inlet end 27 of tube 4. For driving the auger 6, a conventional electric motor M is mounted on the side wall of tube 4 adjacent the end wall 20 with its output shaft 46 in driving engagement with the auger 6 through gears 48 and 50 mounted respectively on shaft 46 and the end portion 24 of auger 6.

The windings of the electromagnet E are enclosed by a cover including a cylindrical sheath or casing 51 and annular end walls 52 and 53, elements 51, 52 and 53 being of plastic or other non-magnetic material, or material that will not act to significantly decrease the intensity of the magnetic field generated by the electromagnet E when the magnet is energized.

Figure 6:
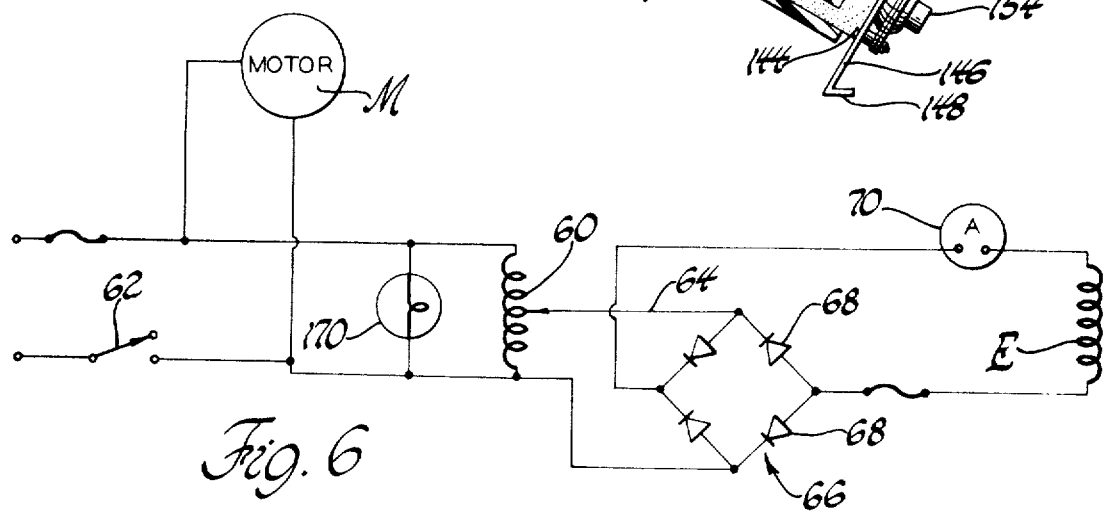
FIG. 6 is a circuit diagram for the apparatus of either FIG. 1 or FIG. 2.

A circuit diagram for the motor and electromagnet E is illustrated in FIG. 6. In FIG. 6, an auto transformer 60, as well as the motor M, are connected with a 110 V power source through a switch 62. The output of the auto transformer is provided by a variable tap 64 connected with a full wave rectifier 66 having four silicon diodes or rectifiers 68. The electromagnet E is connected in series with the variable tap 64. The position of the variable tap determines the voltage output of the transformer 60, and hence the current to the electromagnet E. An ammeter 70 is connected in series with the electromagnet E to provide an indication of the current flow through the electromagnet, and hence the intensity of the magnetic field.

When switch 62 is closed, the electromagnet E and the motor M are both energized to respectively cause rotation of auger 6 and to produce a magnetic field within tube 4, the intensity of the magnetic field being determined by the position of the variable tap 64. When seed is fed from hopper 32 into the inlet end 27 of tube 4 at a rate determined by the position of the slide valve 38, the auger 6 causes the seeds to move through the field of the magnet E with a turbulent rolling and tumbling motion so that each seed assumes almost every conceivable position or orientation with respect to the magnetic field as it passes through the magnetic field set up in the length of tube 4 on which the magnet E is mounted. By moving the slide valve 38 toward the right as viewed in FIG. 1, the size of the inlet opening into tube 4 is increased, and conversely, movement of slide valve 38 toward the left in FIG. 1 decreases the size of the inlet opening. As the seed moves through the magnetic field, the rolling and tumbling motion of the seeds is enhanced by the action of centrifugal force on the seed due to the frictional engagement of the seed with the surfaces of the auger. The turbulent rolling and tumbling motion of the seed is further enhanced by the inclined position of the auger and tube due to the action of gravity.

The above described apparatus has been successfully tested with a variety of crops. In each case, crop yield was increased with seeds treated by the apparatus over that of untreated seeds. Examples of crops tested are set forth below. The apparatus used to treat the seeds set forth in the following examples consisted of a tube 4 of polyvinyl chloride having an outer diameter of four inches and a wall thickness of 0.150 inches. The electromagnet E comprised 13,800 turns of No. 28 gauge copper wire wound around the tube over an axial length of 5 inches (i.e., between members 51 and 53 of FIG. 1). The auger material was 1020 cold rolled steel with a shaft diameter of 1 ⅝ inches. The pitch ("P" in FIG. 1) of the auger flight was approximately 3 ¾ inches. The auger was driven at a speed of approximately 400 revolutions per minute. The seeds were fed through the apparatus at a rate of approximately 60 bushels per hour, or 8 cubic feet per hour, or more. The seed was subjected to a magnetic field intensity averaging approximately 100 gauss in the space between the outer surface of shaft 10 and the inner surface 16 of tube 4. Measurements of the field intensity were taken by a gauss meter at the inner surface of the tube approximately at point $a$ in FIG. 1, at approximately halfway between the outer surface of the auger shaft and the inner surface of the tube at approximately point $b$ in FIG. 1, and a the outer surface of the auger shaft at approximately point $c$ in FIG. 1. Points $a$, $b$, and $c$ in FIG. 1 are located substantially the midpoint of the axial length of magnet E. The field intensity measured approximately 110 gauss, and 85 gauss at points $a$, $b$, and $c$, respectively. The current flow through the winding of the magnet was approximately two amperes from a 110-volt power source. In tests other than those described below, an average field intensity of 200 gauss was obtained with a current of 3.5 amperes. In the following examples, the terms "treated seeds" and "treated crops" refer to seeds treated by the above described apparatus, that is to say, all of the test examples set forth below refer to tests carried out by the above described apparatus.

EXAMPLE I

In this test, corn, both treated and untreated, was planted in a two acre field. Untreated seed was planted in six rows each one-half mile long, and treated seed was planted in six rows each one-half mile long. The yield from the untreated corn was 160.6 bushels per acre. The yield from the treated corn was 170.6 bushels per acre.

EXAMPLE II

In this test, treated and untreated sugar beets were planted in a 19.9 acre field in adjoining portions of the field. The treated seeds were treated by the above-described apparatus one week before planting. The treated and untreated seeds were planted at the same time. 8.32 acres of crop from the untreated seed and 6.88 acres of crop from the treated seeds were harvested over a three day period. The total weight of the crop from the untreated seeds was 318,915 lbs. The total weight of the crop from the treated seeds was 270,529 lbs. The yield of the untreated seeds was 38,331 bushels per acre, while the yield from the treated seeds was 39,321 bushels per acre. The sugar test for the untreated seeds indicated 15.81 percent. The sugar test for the treated crop indicated 16.12 percent. The amount of sugar per acre from the untreated crop was 6,060 lbs., and the amount of sugar per acre obtained from the treated seeds was 6,338 lbs. (Note that the harvesting took place over a three-day period instead of all on the same day).

EXAMPLE III

In this test, 6 acres of treated and untreated oats were planted. The treated seed was treated by the apparatus described above 1 day before planting. The treated and untreated seeds were planted on the same day. The seedlings from the treated seed emerged approximately two days ahead of the seedlings from the untreated seed. The crop from the treated seed was observed to have grown faster and to have heavier and larger kernels throughout the growth period. At harvest, the untreated seed yielded 45 bushels per acre, while the treated seed yielded 79 bushels per acre.

EXAMPLE IV

In this test, 6 acres of sorghum was planted partially with treated seeds, and partially with untreated seeds. The yield from the treated seeds was 13 percent greater than the yield from the untreated seed. A protein analysis indicated 9.3 percent for the crop from the untreated seed, and 11.1 percent for the crop from the treated seed.

EXAMPLE V

In this test, snap beans were planted in two adjacent rows, one row being planted with treated seeds and the other row being planted with untreated seeds. The untreated row yielded 40 lbs. of beans, and the treated row yielded 64.5 lbs. of beans, or 60 percent more beans than the untreated row.

EXAMPLE VI

In this test, treated and untreated wheat was planted in a 400-acre field. The crop from the treated seed emerged 2 days earlier than the untreated seed, and the yield per acre for the treated seed was 20 percent more than the yield per acre for the untreated seed. The stooling for the treated seed was 10 percent greater than for the untreated seed. The kernels of the crop from the treated seed were approximately 10 percent larger than the kernels from the untreated crop. The headings for the treated crop were approximately a half inch larger than for the untreated crop. A protein analysis showed the treated wheat running at 12.90 percent and the untreated wheat at 10 percent.

EXAMPLE VII

An 80-acre field was planted with corn. One-half of the seed was treated with the apparatus described above and the other half was untreated. The field was planted in alternate strips of eight rows of treated and eight rows of untreated seed across the field. The width between the rows was 30 inches. The field was planted at a density of 22,000 plants per acre. The entire field was planted on the same day. The entire field was harvested on the same day, the treated and untreated crop being kept separate. The crop yield from the treated seeds was 118 bushels per acre, while the crop yield from the untreated seeds was 108 bushels per acre.

EXAMPLE VIII

In this test, treated and untreated soy beans were planted in four 30 inch rows. The untreated crop yield was 34.8 bushels per acre with a moisture content of 17.87 percent. The treated crop yield was 44.5 percent bushels per acre with a moisture content of 14.27 percent.

EXAMPLE IX

In this test, corn was planted in a 3.68 acre field. One-half of the field was planted with seed treated with the above apparatus one day before planting, and the other half of the field was planted with untreated seed so that the field included 1.84 acres of treated seed and 1.84 of untreated seed. The entire field was harvested on the same day and the treated and untreated crop were kept separate. The weight of the crop from the untreated seed was 12,350 lbs. The moisture content of the untreated crop was 32.5 percent. The untreated crop produced 119 bushels. The crop from the treated seed tasseled four to 5 days earlier than the crop from the untreated seed. The weight of the crop harvested from the treated seed was 13,020 lbs. The moisture content of the treated crop was 32 percent and the yield from the treated crop was 126 bushels.

EXAMPLE X

In this test, a 25-acre field was planted with corn. Twenty acres of the field were planted with untreated seed and five acres were planted with treated seed. The treated seed was treated one day before planting. 1.33 acres of the crop from the treated seed and 1.33 acres of crop from the untreated seed were harvested on the same day. The weight of the crop from the untreated seed was 7,960 lbs. and yield per acre of No. 2 corn was 90.1 bushels. The weight of the crop from the treated seed was 8,380 lbs. and the yield per acre of No. 2 corn was 96.3 bushels.

The apparatus shown in FIG. 2 is collectively designated by reference numeral 101 and includes a magnet E mounted on a tubular conduit 104, the magnet E and tubular conduit 104 being of substantially the same construction as the tubular conduit 4 and magnet E of the embodiment of FIG. 1. The electromagnet E is mounted on the tubular conduit 104 between the ends thereof for providing a magnetic field within the conduit 104. As in the previously described embodiment, the electromagnet E may comprise a coil winding wrapped around the conduit 104 and extending along a portion of the axial length of the conduit 104. As in the previously described embodiment, a cover of non-magnetic material is mounted on the conduit and enclosed the coil winding, the cover comprising a cylindrical sheath or casing 152 and annular end members 151 and 153 (FIG. 4).

The tubular conduit 104 has an inlet opening 126 spaced from the electromagnet E (FIG. 5), and an outlet or discharge opening in which is mounted a discharge spout 130 (FIG. 2). The inlet opening 126 is cut from the side wall of tube 104 in the embodiment of FIG. 5, and includes axially spaced end edges 127 and 128 joined by side edges 129. An auger 106 is mounted in the conduit 104 for rotation with respect to the conduit. Auger 106 includes a shaft 110 coaxial with the conduit 104, and a helical flight 112 for moving seeds from the inlet 126 to the discharge spout 130. A motor M is drivingly engaged with auger 106 and is operable to drive the auger to move the seeds through the conduit 104 from the inlet 126 to the outlet and discharge spout 130, and at the same time cause the seeds to roll and tumble as they move through the conduit so the seed is oriented in a multiplicity of positions with respect to the field of the electromagnet E as it passes through the field.

With reference to FIG. 4, the portion 111 of shaft 110 coextensive with the axial length of the electromagnet E is reduced in cross-section to provide an abruptly increased volume within the conduit 104 for the seeds as the seeds move into the field of magnet E to increase the turbulent rolling and tumbling motion of the seeds. In the embodiment shown in FIGS. 2 and 4, the helical flight 112 is separated at its inner periphery from the reduced cross-section portion 111 of shaft 110. In apparatus according to the construction of FIG. 2 that has been successfully tested, the diameter of the shaft 110 is 1 ⅝ inches, and the diameter of the reduced portion is one-half inch.

Nylon bristles 113 are mounted on the helical flight 112 and form the outer periphery of the helical flight 112. The bristles 113 project toward the inner surface 116 of the tube 104. The provision of the bristles at the periphery of the auger flight reduces the likelihood of seeds being damaged between the auger flight and the inner surface of the tube.

The apparatus of FIG. 2 includes a hopper 132 mounted on the tubular conduit 104. Hopper 132 has a central trough portion 134 which receives the tube 104. A pair of bottom wall panels 136 project outwardly from the upper edges of the trough portion 134 and lie in a plane generally parallel to the axis of the tube 104. A strap member 137 extends over the upper surface of tube 104 and has its ends secured to the bottom wall panels 136 by conventional fasteners. The hopper further includes a rear wall 138 which projects upwardly from the rear edges of the bottom wall panels 136 that are adjacent the rear edge 127 of the inlet opening 126, and extends upwardly in a plane substantially perpendicular to the axis of the conduit 104, the inlet opening 126 extending forwardly from the rear wall 138 and the rear edges of the bottom wall panels 136. A pair of side walls 140 extends between the forward edges of the bottom wall panels 136 and the rear wall 138. Front panels 141 extend downwardly in FIG. 2 from the forward edges of the bottom wall panels 136 and a peripheral outwardly extending flange 143 is formed along the edges of the rear walls, side walls, and front panels 141.

A perforated plate 142 overlys the inlet opening 126 and extends between the bottom wall panels 136 and the side and rear walls for regulating the flow of seeds into the inlet opening 126.

The tubular conduit 104 includes a portion 144 which projects beyond the rear wall 138 of the hopper on the opposite side of the rear wall 138 from the inlet opening 126 as shown in FIG. 5. A rear support member 146 is mounted on the end of the end portion 144 of tube 104 for supporting the inlet end of the tube. The support member 146 is in the form of a plate having a lower edge projecting beneath the trough portion 134 of the hopper, and a supporting flange 148 projecting rearwardly from the lower edge of the plate 146. The discharge end of the conduit 104 is supported by a front support member 150 (FIG. 2) secured to the tube 104 on the opposite side of the electromagnet from the rear support member 146. The front support member projects from tube 104 a greater distance than the rear support member 146 so that the tube 104 is supported in an inclined position with the outlet 130 raised with respect to the inlet 126 in a manner similar to the embodiment of FIG. 1. A bearing assembly 152 is mounted on the rear support plate 146, and one end 154 of the auger shaft 110 is rotatably supported in the bearing assembly 152.

The front supporting member 150 includes a pair of legs 152 projecting upwardly from a base member 154. The legs 152 have their upper ends received in socket members 156 mounted on the opposite sides of a support bracket 158 secured to the upper end of tube 104 by conventional U-Bolts or the like. Braces 153 extend between the legs 152 near the upper ends thereof. Bracket 158 supports the motor M and a control box 160 containing the auto transformer and ammeter for the electromagnet E. The drive mechanism between the shaft of the motor M and the shaft of the auger 106 is covered by a shield 162. The drive between motor M and the auger 106 is transmitted by gears or pulleys in a manner similar to that disclosed in the embodiment of FIG. 1.

Thus, the apparatus shown in FIG. 2 comprises a magnet E for producing a magnetic field; means 104 defining a path for seeds through the magnetic field, and means 106 for causing seeds to roll and tumble while in the magnetic field to vary the orientation of each seed with respect to the magnetic field as it passes through the magnetic field. The conduit 104 is of polyvinyl plastic or other material that is relatively non-magnetic, or anti-ferromagnetic, as in the previously described embodiment.

Figure 7:
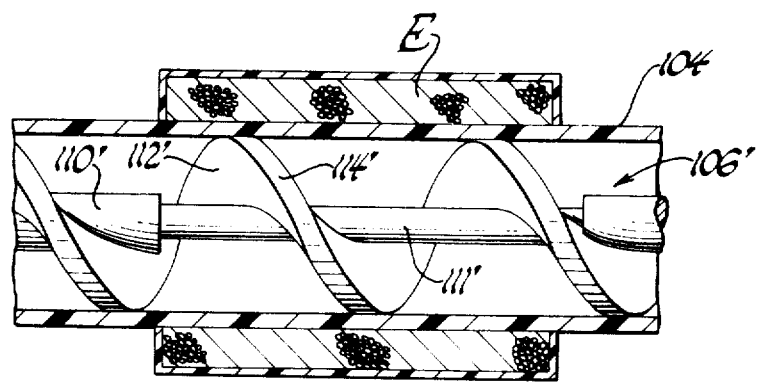
FIG. 7 is a view similar to FIG. 4 illustrating an alternative construction.

FIG. 7 illustrates a variation in the construction of the auger. Reference numeral 106' includes a shaft 110' and a helical flight 112'. The shaft 110' has a reduced diameter portion 111' that extends through the field of magnet E to provide the abruptly increased space for the seeds as the seeds travel through the field of magnet E. The construction of auger 106' is similar to the construction of auger 106 except that the helical flight 112' is not provided with bristles but instead the periphery 114' of the flight 112' extends into close proximity with the inner surface of the tube 104. The inner periphery of the helical flight 112' may also be spaced from the surface of the reduced portion 111' as is the case with the embodiment of FIG. 4.

Experimentation to date has indicated that the rate of germination and growth of the plants from magnetically treated seeds is also influenced by the temperature of the seeds at the time of treatment as well as the moisture content of the seeds at the time of treatment. Accordingly, in the apparatus shown in FIGS. 2 through 5, heating means is mounted on the conduit for heating seeds between the inlet 126 and the electromagnet E. The heating means in the illustrated embodiment comprises an infra-red heating element 170 mounted in the wall of the conduit 104 between the inlet 126 and the electromagnet E so that the radiation from the infra-red heating element 170 will increase the temperature of the seeds prior to their entry into the field of the electromagnet E.

In order to protect the infra-red heating element 170 from possible damage by the turbulent motion of the seeds as the seeds move through the conduit 104, a shield 172 of transparent plastic, or some other material that passes infra-red radiation, is mounted in the wall of tube 104. The infra-red heating element 170 is connected in the circuit of the motor and auto-transformer as illustrated in the circuit diagram of FIG. 6. The infra-red heating element can thus raise the temperature of the seeds to the desired level prior to entry of the seeds into the field of the electromagnet E. Moisture can be added to the seeds prior to feeding the seeds into the hopper as desired by a humidifier.

FIGS. 8 and 9 illustrate another embodiment of the invention wherein seeds are fed by gravity through the magnetic field for treatment. The apparatus shown in FIG. 8 is collectively designated by reference numeral 201 and comprises an electromagnet E mounted on a tubular conduit 204 of plastic or other relatively non-magnetic material. A plurality of deflecting elements collectively designated by reference numeral 206 are mounted in the tubular conduit within the field of the magnet E. The deflecting elements 206 each comprises a rod of plastic or other relatively non-magnetic material. Each of the rods has its ends mounted in the wall of the tube 204. In FIG. 8, the rods are respectively individually designated by reference characters $a, b, c, d, e, f, g, h, j, k, m$ and $n$.

Rods $a-n$ are successively axially spaced along the length of the tube, and each extends diametrically across tube 204 transversely of the longitudinal axis of tube 204. As shown most clearly in FIG. 9, each of the rods $a-n$ is disposed angularly about the axis of tube 204 with respect to the adjacent rod. Thus, the upper rod $a$ is disposed at approximately a 45° angle with the adjacent rod $b$ which in turn is disposed at approximately a 45° angle with respect to rod $c$, and so forth.

Mounted on the tubular conduit 204 is the feed hopper 208 having a hollow, cylindrical mounting portion 210 telescopically mounted on one end of the tubular conduit 204 and defining a feed opening 212 from the hopper 208 into the end of tube 204. The hopper 208 has a wall portion 214 extending outwardly from the mounting portion 210 in a funnel-like manner.

The rate of flow of seeds from the hopper 208 into the upper end of tube 204 is controlled by a seed metering member 216 carried at one end of a rod 218 mounted on a cross bar 220. The cross bar 220 extends diametrically across the hopper 208 with its opposite end secured in a conventional manner to opposite surfaces of the wall 214 of hopper 208. Rod 218 is adjustably mounted in the cross bar 220 and is formed at its upper end with an eyelet 222. Rod 218 is threaded at 224 adjacent the eyelet 222 for adjustment relative to a nut 226 secured to the upper surface of the cross bar 220. The lower end of the rod is threaded as shown at 228 for threaded engagement with nuts 230 and 232 for adjustably securing the metering member 216 relative to the feed opening 212. The metering member 216 is in the form of a conical, hollow plastic member; and adjustment of the metering member 216 axially relative to the feed opening 212 varies the size of the opening and hence the rate of flow of seeds from hopper 208 into the upper end of tube 204.

The coil windings of the electromagnet E are enclosed by an outer cylindrical casing 234 which is concentric with the tubular conduit 204 and has one end 236 which projects axially beyond the inlet end of the tubular conduit 204 for engagement with the outer surface of the upwardly extending wall 214 of the hopper 208. End 236 of the casing 234 is outwardly flared to better receive the outwardly flared wall 214 of the hopper. An annular end cover member 238 overlys one end of the windings of magnet E adjacent the inlet end of the tubular conduit 204 and extends between the outer casing 234 and the outer surface of tube 204. The end cover 238 is formed within inner flange 240 engaging the lower end of the mounting portion 210 and defines a support for the hopper mounting portion 210. A similar end cover 242 extends between the lower end of the outer casing 234 and the outer surface of tube 204 for covering the lower end of the windings of the electromagnet E. A supporting flange 244 projects radially outwardly from the casing 234 for supporting the assembly over a feed chute or the like for feeding seeds into a suitable container.

In the apparatus of FIGS. 8 and 9, the seeds are fed into the upper end of tube 204 and are caused to roll and tumble while in the field of magnet E by the deflecting elements 206 a-n so that each seed assumes a variety of positions relative to the magnetic field as it passes through the magnetic field. As the seeds fall through the tube 204, the rods a-n interrupt the travel of the seeds through the magnetic field and cause the seed to bounce back and forth between the rods and inner surface of tube 204.

Apparatus has been constructed and successfully tested according to the construction of FIGS. 8 and 9 wherein the tube 204 is of polyvinyl chloride material having an outer diameter of approximately 4 inches and a wall thickness of 0.150 inches. The electromagnet E consists of 13,800 turns of No. 28 gauge copper wire, and seeds were successfully treated with the intensity of the magnetic field as measured by a gauss meter was approximately 110 gauss adjacent the inner surface of tube 204 at approximately point $x$ in FIG. 8, and approximately 75 gauss at the center line of the tube at approximately point $y$ in FIG. 8 and approximately 100 gauss at approximately point $z$ in FIG. 8. Point $z$ is located at half the radial distance from the center line to the inner surface of tube 204.

In each of the embodiments, it is estimated that each seed is in the magnetic field for approximately three seconds during which time the seed is caused to assume numerous positions with respect to the magnetic field.

There have been some indications that greater success was provided in treatment of the seeds when the North pole of the electromagnet E is located on the inlet side of the apparatus of FIGS. 1 and 2, and on the lower side of the apparatus of FIG. 8.

While several specific forms of the invention have been illustrated and described in the accompanying drawings and the foregoing specifications, the invention is not limited to the exact construction shown. Alternative construction and arrangement of parts, all falling within the scope and spirit of the invention, will be apparent to those skilled in the art.

I claim:

1. Apparatus for magnetically treating seeds comprising: a magnet for producing a magnetic field; conduit means secured to the magnet and extending through the magnetic field thereof for conducting seeds through the magnetic field; and means in said conduit for causing seeds moving through the magnetic field in said conduit to roll and tumble while in the magnetic field tO vary the orientation of each seed with respect to the magnetic field as it passes through the magnetic field to induce magnetism in the seeds.

2. Apparatus as claimed in claim 1 wherein said conduit comprises a tube.

3. Apparatus as claimed in claim 2 wherein said means for causing seeds to roll and tumble in the magnetic field comprises a conveyor assembly supported in said tube and operable to move seeds in a continuous stream through the magnetic field.

4. Apparatus as claimed in claim 3 wherein said conveyor assembly includes an auger.

5. Apparatus as claimed in claim 4 wherein said auger includes a shaft extending along the axis of said tube and a helical flight on said shaft, said tube being formed with end wall members at opposite ends thereof, said shaft being rotatably supported in said end wall members.

6. Apparatus as claimed in claim 5 wherein said magnet comprises an electro-magnet mounted on said tube such that the tube extends coaxially through said magnet.

7. Apparatus as claimed in claim 6 wherein said tube is formed with an inlet opening spaced from said magnet, and a discharge opening spaced from said magnet on the opposite side thereof from said inlet opening.

8. Apparatus as claimed in claim 7 including support means mounted on said tube for supporting said tube in an inclined position with the discharge opening elevated with respect to the inlet opening.

9. Apparatus as claimed in claim 8 wherein the portion of the shaft of said auger that is coextensive with said magnet is reduced in cross-section to provide an abruptly increased volume at said magnet for seeds moving through the tube to increase the rolling and tumbling motion of the seeds in the magnetic field.

10. Apparatus as claimed in claim 9 wherein bristles are mounted on said helical flight and project toward the inner surface of said tube with the ends of said bristles defining the periphery of said helical flight.

11. Apparatus as claimed in claim 7 wherein said tube has an inlet opening spaced from said magnet, and further including heating means mounted on said tube between said inlet opening and said magnet operable to heat seeds in said tube as they move from the inlet opening to the magnetic field.

12. Apparatus as claimed in claim 11 wherein said heating means comprises an infra-red heating element mounted on the wall of said tube, and further including a transparent shield mounted in the wall of said tube to protect the infra-red heating element without interfering with the heating action thereof on seeds moving through the tube.

13. Apparatus as claimed in claim 12 wherein the portion of the shaft of said auger that is located within the magnetic field is reduced in cross-section to provide an abruptly increased volume for the seeds in the magnetic field to increase the rolling and tumbling motion of the seeds in the magnetic field.

14. Apparatus as claimed in claim 13 including support means mounted on said tube for supporting said tube in an inclined position with the discharge opening elevated with respect to the inlet opening.

15. Apparatus as claimed in claim 14 including a feed hopper for feeding seeds into said inlet opening, and means for regulating the flow of seeds from said feed hopper into said inlet opening.

16. Apparatus as claimed in claim 15 wherein said last named means comprises a perforated baffle plate in said feed hopper overlying the inlet opening.

17. Apparatus as claimed in claim 15 wherein said last named means comprises a slide valve on said tube for selectively adjusting the size of said inlet opening.

18. Apparatus as claimed in claim 13 wherein bristles are mounted on said helical flight and project toward the inner surface of said tube with the ends of said bristles defining the periphery of said helical flight.

19. Apparatus as claimed in claim 12 wherein bristles are mounted on said helical flight and project toward the inner surface of said tube with the ends of said bristles defining the periphery of said helical flight.

20. Apparatus as claimed in claim 5 wherein the portion of the shaft of said auger that is located within the magnetic field is reduced in cross-section to provide an abruptly increased volume for the seeds in the magnetic field to increase the rolling and tumbling motion of the seeds in the magnetic field.

21. Apparatus as claimed in claim 5 wherein bristles are mounted on said helical flight and project toward the inner surface of said tube with the ends of said bristles defining the periphery of said helical flight.

22. Apparatus as claimed in claim 2 wherein said means for causing seeds to roll and tumble in the magnetic field comprises a plurality of deflecting elements mounted in said tube in the path of movement of seeds passing through the magnetic field.

23. Apparatus as claimed in claim 22 wherein said deflecting elements each comprises a rod of non-ferrous material having its ends mounted in the wall of said tube.

24. Apparatus as claimed in claim 23 wherein each of said rods extends diametrically across said tube transversely of the axis of said tube.

25. Apparatus as claimed in claim 24 wherein said rods are successively axially spaced along the length of the tube within the area of the magnetic field provided by said magnet, and each of said rods is disposed angularly about the axis of said tube with respect to the adjacent rod.

26. Apparatus as claimed in claim 22 including a feed hopper having an outlet coaxially disposed with respect to said tube for feeding seeds through the magnetic field.

27. Apparatus as claimed in claim 26 wherein said hopper includes a funnel-shaped wall converging toward one end of said tube, and further including means for regulating the flow of seeds from said feed hopper into said one end of said tube.

28. Apparatus as claimed in claim 27 wherein said last named means comprises a downwardly and outwardly flared distributor selectively movable axially relative to said one end of said tube to vary the rate of flow of seeds into the tube and through the magnetic field.

29. Apparatus as claimed in claim 1 wherein said conduit has an inlet opening spaced from said magnet, and further including heating means mounted on said tube between said inlet opening and said magnet operable to heat seeds in said tube as they move from the inlet opening to the magnetic field.

30. Apparatus as claimed in claim 29 wherein said heating means comprises an infra-red heating element mounted on the wall of said tube, and further including a transparent shield mounted in the wall of said tube to protect the infra-red heating element without interfering with the heating action thereof on seeds moving through the tube.

31. Apparatus for magnetically treating seeds comprising: a tubular conduit; an electromagnet mounted on said tubular conduit between the ends thereof for providing a magnetic field within said conduit, said electromagnet comprising a coil winding wrapped around said conduit, said coil winding extending along a portion of the axial length of said conduit; a cover of non-magnetic material mounted on said conduit and enclosing said coil winding; means defining an inlet for said conduit for receiving seeds from a supply hopper, said inlet being spaced from said electromagnet, means defining an outlet for said conduit spaced from the electromagnet on the opposite side thereof from said inlet; said tube being adapted to be supported in an inclined position with said outlet elevated with respect to said inlet opening; an auger received in sAid conduit for rotation with respect thereto, said auger having a shaft coaxial with said conduit and a helical flight for moving seeds from the inlet to the outlet of said conduit upon rotation of said auger; support means at the opposite ends of said tube, said shaft having its opposite ends rotatably supported by said support means; and a motor drivingly engaged with said auger and operable to drive said auger to move seeds through the conduit from the inlet to the outlet and cause the seeds to roll and tumble as they move through the conduit so that each seed is oriented in a multiplicity of positions with respect to the field of said electromagnet as it passes through the magnetic field.

32. Apparatus as claimed in claim 31 wherein the shaft of said auger is reduced in cross-section along the axial length of said electromagnet.

33. Apparatus as claimed in claim 32 further including bristles mounted on said helical flight and forming the outer periphery thereof.

34. Apparatus as claimed in claim 33 further including heating means mounted on said conduit for heating seeds between the inlet and said electromagnet.

35. Apparatus as claimed in claim 34 wherein said heating means comprises an infra-red heating element mounted in the wall of said conduit between the inlet and the electromagnet.

36. Apparatus as claimed in claim 35 further including a shield mounted in the wall of said conduit between the interior of said conduit and said infra-red heating element, said shield being of material that passes infra-red radiation.

37. Apparatus as claimed in claim 31 further including bristles mounted on said helical flight and forming the outer periphery thereof.

38. Apparatus as claimed in claim 31 further including heating means mounted on said conduit for heating seeds between the inlet and said electromagnet.

39. Apparatus as claimed in claim 38 wherein said heating means comprises an infra-red heating element mounted in the wall of said conduit between the inlet and the electromagnet.

40. Apparatus as claimed in claim 39 further including a shield mounted in the wall of said conduit between the interior of said conduit and said infra-red heating element, said shield being of material that passes infra-red radiation.

41. Apparatus as claimed in claim 40 further including bristles mounted on said helical flight and forming the outer periphery thereof.

42. Apparatus as claimed in claim 31 wherein said inlet is defined by an opening in the side wall of said conduit, said opening having axially spaced end edges joined by a pair of side edges.

43. Apparatus as claimed in claim 42 further including a hopper mounted on said conduit; said hopper having a central trough portion receiving said conduit, a pair of bottom wall panels projecting outwardly from the respective upper edges of said trough portion and lying in a plane generally parallel to the axis of said conduit; a rear wall projecting from the rear edges of said bottom wall panels adjacent the rear edge of said inlet opening in a plane substantially perpendicular to the axis of said conduit such that said inlet opening extends forwardly from the rear wall and rear edges of said bottom wall panels, and a pair of side walls extending between the forward edges of said bottom wall panels and said rear wall.

44. Apparatus as claimed in claim 43 further including a perforated plate overlying said inlet opening and extending between the bottom wall panels and side and rear walls.

45. Apparatus as claimed in claim 44 wherein said conduit includes a portion projecting beyond the rear wall of said hopper on the opposite side thereof from said inlet opening, and further including a rear support member mounted on the end of said portion for supporting said end of said conduit.

46. Apparatus as claimed in claim 45 wherein said rear support member comprises a plate having a lower edge projecting beneath the trough portion of said hopper, and a supporting flange projecting rearwardly from said lower edge.

47. Apparatus as claimed in claim 46 further including a front support member mounted on said conduit on the opposite side of said electromagnet from said rear support member, said front support member projecting from said conduit a greater distance than said rear support member so that said conduit is supported in an inclined position with the outlet raised with respect to the inlet.

48. Apparatus as claimed in claim 46 further including a bearing assembly mounted on said rear support plate, one end of said auger shaft being rotatably supported in said bearing assembly.

49. Apparatus for magnetically treating seeds comprising: a tube of non-magnetic material defining a conduit for seeds; an electromagnet mounted on said tube for producing a magnetic field within said tube and comprising a coil winding wrapped around said tube and capable of generating a magnetic flux field having an intensity of approximately 110 gauss at the inner surface of said tube, approximately 75 gauss at the center of said tube, and approximately 100 gauss at from one-half to two-thirds of the radial distance from the center to the inner surface of said tube; and means in said tube for causing seeds moving through the magnetic field to assume a multiplicity of positions while moving through the magnetic field so that the orientation of each seed is varied as it passes through the magnetic field.

50. Apparatus as claimed in claim 49 wherein said last named means comprises an auger extending coaxially through said tube, said auger having a shaft coaxial with the axis of said tube and a helical flight operable upon rotation of said auger to move seeds through said tube and hence through the flux field of said magnet; and a motor operable to drive said auger at a speed of at least 400 revolutions per minute.

51. Apparatus as claimed in claim 50 wherein said tube is of polyvinyl chloride and has an outer diameter of approximately four inches and a wall thickness of approximately 0.15 inches and wherein the shaft of said auger has a diameter of approximately 1⅝ inches, and the pitch of said helical flight is approximately 3¾ inches, and said electromagnet extends approximately five inches along the length of said tube.

52. Apparatus as claimed in claim 51 wherein the shaft of said auger is reduced in cross-section to approximately one-half inch along the length of said electromagnet.

53. Apparatus as claimed in claim 52 further including nylon bristles mounted on said helical flight and forming the outer periphery thereof.

54. Apparatus as claimed in claim 53 wherein the helical flight is unconnected with the auger shaft along the length of said reduced portion only.

55. Apparatus as claimed in claim 51 further including nylon bristles mounted on said helical flight and forming the outer periphery thereof.

56. Apparatus as claimed in claim 49 wherein said last named means comprises a plurality of deflecting elements mounted in said tube in the path of movement of seeds passing through the field of said electromagnet.

57. Apparatus as claimed in claim 56 wherein said deflecting elements each comprises a rod having its ends mounted in the wall of said tube and extending diametrically across said tube substantially transversely of the axis of said tube.

58. Apparatus as claimed in claim 57 wherein said rods are successively axially spaced along the length of the tube within the area of the magnetic field provided by said magnet, and each of said rods is disposed angularly about the axis of said tube with respect to the adjacent rod.

59. Apparatus as claimed in claim 58 wherein said tube and said rods are of plastic material, and said tube has an outer diameter of approximately four inches and a wall thickness of approximately 0.15 inches.

60. Apparatus for magnetically treating seeds comprising: a tubular conduit; an electromagnet mounted on said tubular conduit for providing a magnetic field within said tubular conduit; a plurality of deflecting elements mounted in said tubular conduit within the field of said magnet; and a feed hopper having a hollow, cylindrical mounting portion telescopically mounted on one end of said tubular conduit and defining a feed opening, said hopper having a wall portion extending outwardly from said mounting portion.

61. Apparatus as claimed in claim 60 further including a metering member carried by said hopper and adjustably movable toward and away from said feed opening to vary the size of the opening through which the seeds can pass.

62. Apparatus as claimed in claim 60 further including an outer cylindrical casing concentric with said tubular conduit and enclosing said magnet, one end of said casing projecting axially beyond said one end of said tubular conduit for engagement with the outer surface of the outwardly extending wall portion of said hopper.

63. Apparatus as claimed in claim 62 wherein said one end of said outer casing is outwardly flared.

64. Apparatus as claimed in claim 63 including an annular end cover overlying the end of said magnet adjacent said one end of said tubular conduit and extending between said outer casing and said tubular conduit and defining a support for the end of the mounting portion of said hopper.

* * * * *